UNITED STATES PATENT OFFICE.

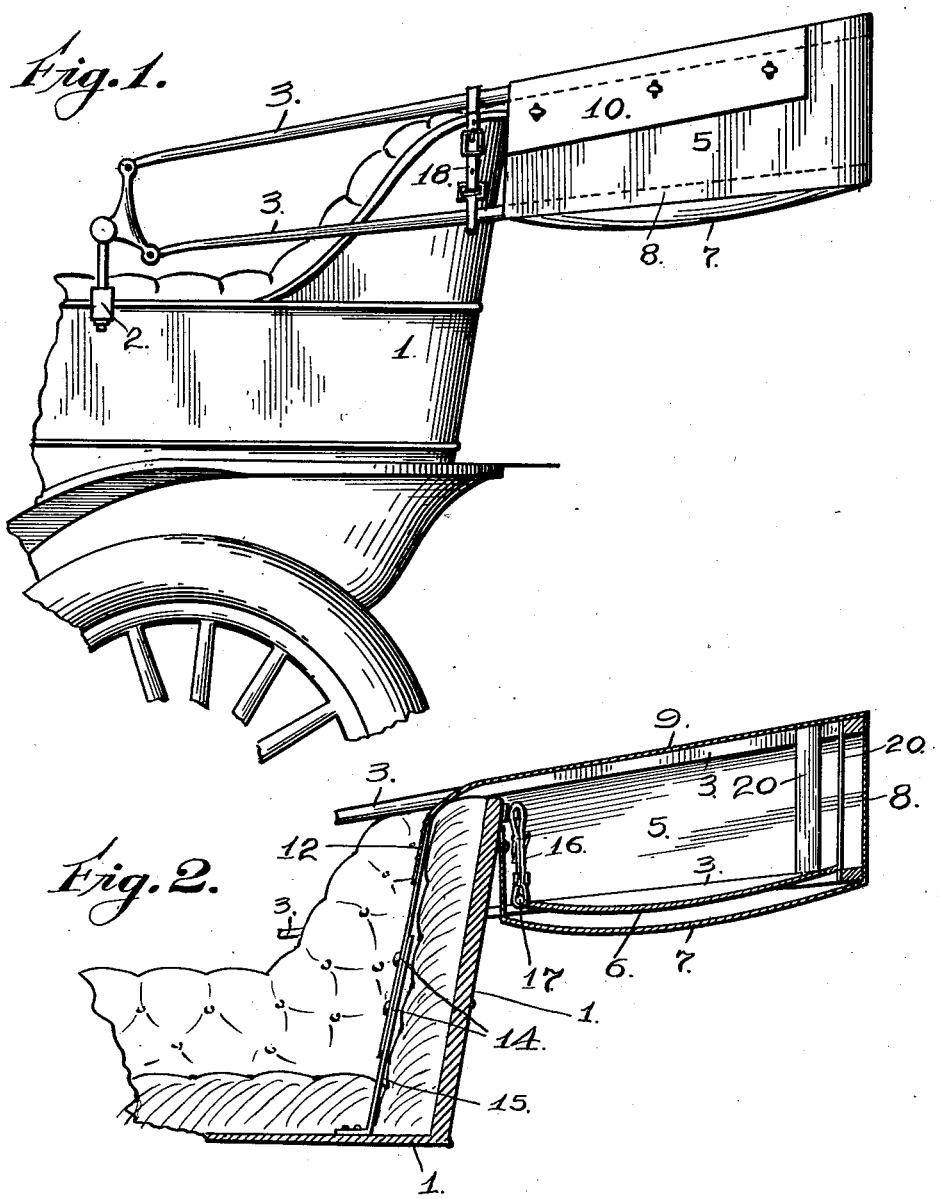

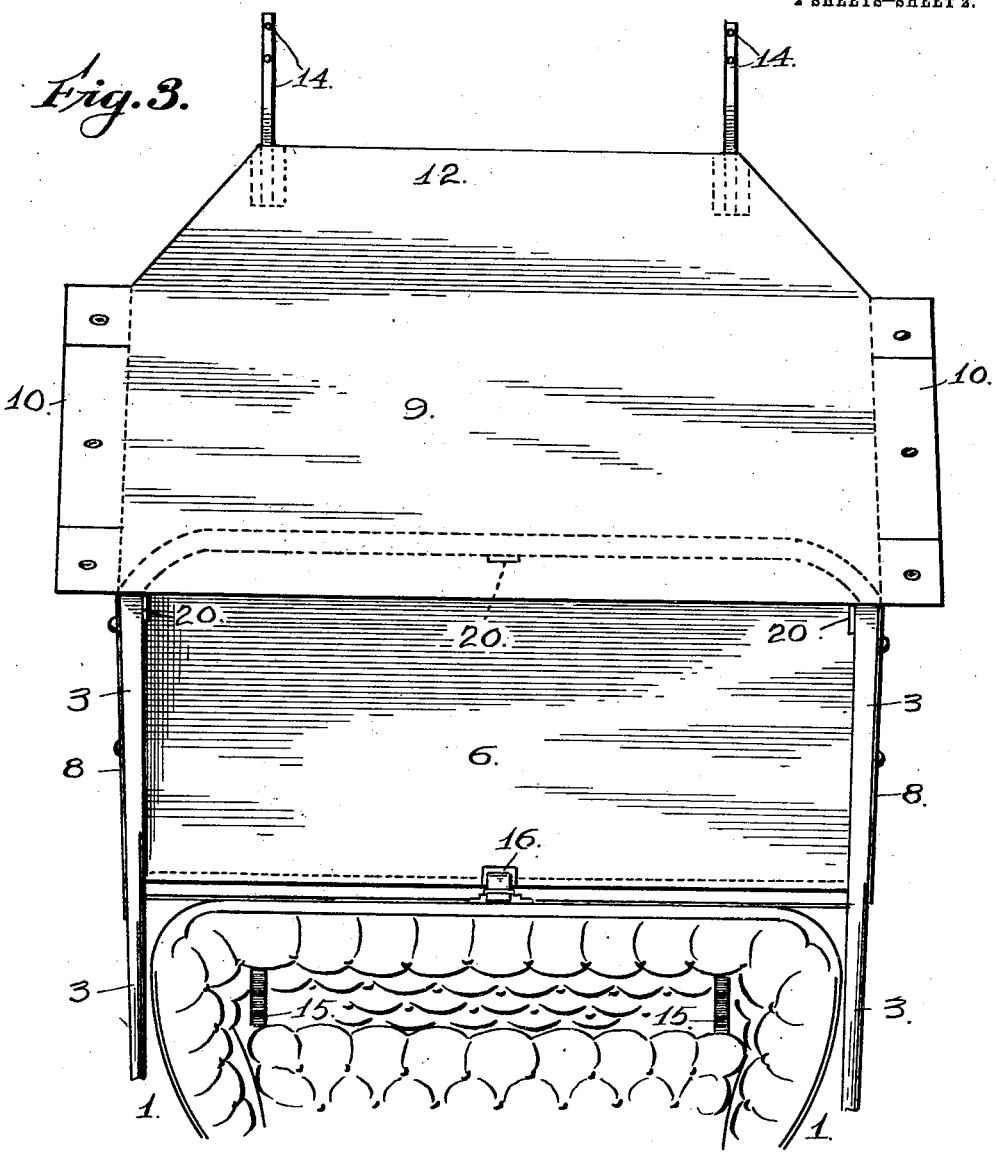

JOHN K. SMITH, OF SANTA ROSA, CALIFORNIA.

DUST-PROTECTOR AND PACKING DEVICE FOR AUTOMOBILES.

999,620.     Specification of Letters Patent.     Patented Aug. 1, 1911.

Application filed June 6, 1910. Serial No. 565,397.

*To all whom it may concern:*

Be it known that I, JOHN K. SMITH, citizen of the United States, residing at Santa Rosa, county of Sonoma, State of California, have invented certain new and useful Improvements in Dust-Protectors and Packing Devices for Automobiles, of which the following is a specification.

My invention relates to receptacles applied to automobiles and other individual vehicles, for the reception of luggage and parcels.

It is the object of the present invention to provide a simple compact and efficient means for stowing and carrying such parcels or personal baggage as would be necessary on an automobile trip or a shopping tour, conveniently disposed and affording protection to the occupants of the car from the cloud of dust which is created by the passing of the vehicle, likewise protecting the parcels or luggage within the carrier.

It is a further object of my invention to provide a carrier that shall be readily accessible to the occupants of the car at all times, so that it shall be unnecessary to stop and unpack or unstrap any part or all of the luggage.

I also wish to provide a carrier, which in addition to the foregoing advantages, shall not be conspicuous as a carrier or tray, but will appear to be the folded cover or canopy with which automobiles are ordinarily supplied. The device which I employ has the further advantage of being able to support and carry considerable weight, the present model being capable of supporting a weight of 500 pounds.

I accomplish those several features by the apparatus disclosed in the drawings appended herewith, in which, Figure 1 is a view showing the rear portion of an automobile with my carrier attached. Fig. 2 is a sectional view of Fig. 1 disclosing the manner in which the carrier is secured to the automobile. Fig. 3 is a plan view showing the cover thrown back or opened.

1 is the rear portion of an automobile body having the usual canopy stanchions 2 in which are mounted the usual type of bows 3 one above the other. These bows extend backward over the rear seat to support a receptacle 5 having a false bottom 6 on which the parcels are deposited. A second bottom 7 made to resemble the slack of a canopy, is tacked to the rear of the under bow. The sides 8 are hung between the two bows at the sides and rear, a cover 9 having side flaps 10 and a front flap 12 extending over the back of the seat so as to be accessible to the occupants thereof, and is fastened by means of ordinary glove snap fasteners 14 to straps 15 secured to the seat.

A supporting strap 16 is fastened at its upper end to the car body, the lower end engaging a transverse supporting rod 17 secured to the lower bow. The lower bow is further supported by side straps 18 depending from the upper bow, the upper bow resting on the car body. To add further to the stability of the carrier, rigid uprights 20 are provided between the bows at their outer ends. This insures protection to the side walls 8 from any heavy or cumbersome parcels and further acts as a support for the outer ends of the lower bow.

The side flaps 10 being secured to the walls 8 by appropriate fasteners, and the front flap 12 secured to the seat straps 15, by means of the fasteners 14, any baggage within the receptacle 5 is readily accessible to the occupants of the car at all times. It is also convenient and protected from the dust, dirt or rain, and the carrier itself, by reason of its extended position from the rear of the car, acts as a dust or dirt shield, intercepting all dust and dirt raised by the passage of the car. Further, owing to the shape, location and construction of the carrier, it is inconspicuous as a carrier or baggage holder inasmuch as it very closely resembles and occupies the position of a folded canopy on top.

It is obvious from the foregoing that I have provided a neat and compact baggage carrier, convenient, accessible and affording protection from the elements to the occupants of the car, also to the baggage, avoiding a cumbersome and unsightly apparatus. I have also provided a carrier capable of supporting a great weight, the construction herein shown being able to support a load of 500 pounds.

Having thus described my invention, what I claim as new and desire to secure by Letters Patent is:

1. In a carrier for automobiles, a pair of horizontally disposed bows secured to the body of the automobile and extending beyond the rear of the seat, suitable side pieces attached to and mounted between the bows at the rear thereof for forming the sides of the carrier, a double bottom in the plane of the lower bow and secured thereto, rigid connections between the bows at their rear ends, a flexible top or cover secured to the back of the upper bow, and side and front flaps on the cover adapted to be secured and unsecured, substantially as described.

2. As an attachment to an automobile, a combined dust shield and parcel carrier, composed of two horizontally disposed bows secured at their inner ends to the canopy stanchions and further supported approximately midway of their length, suitable material permanently secured between the bows forming the sides of the receptacle, and material stretched across the bottom bow forming the bottom of the receptacle, substantially as described.

In testimony whereof, I affix my signature in presence of two witnesses.

JOHN K. SMITH.

Witnesses:
J. H. WATTERS,
Mrs. A. M. WATTERS.

---

Copies of this patent may be obtained for five cents each, by addressing the "Commissioner of Patents, Washington, D. C."